United States Patent Office 3,322,784
Patented May 30, 1967

3,322,784
BENZIMIDAZOLIUM COMPOUNDS
Reinhard Mohr, Offenbach (Main), and Rolf Bender, Obertshausen, near Offenbach, Germany, assignors to Farbwerke Hoechst Aktiengesellschaft vormals Meister Lucius & Brüning, Frankfurt am Main, Germany, a corporation of Germany
No Drawing. Filed Dec. 8, 1964, Ser. No. 416,921
Claims priority, application Germany Dec. 13, 1963, F 41,530; Oct. 23, 1964, F 44,294
6 Claims. (Cl. 260—309.2)

The present invention relates to new benzimidazolium compounds and to a process for preparing them; in particular, it relates to benzimidazolium compounds of the general formula

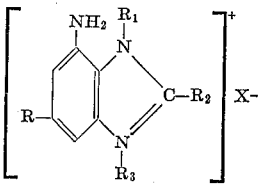

wherein R represents a halogen atom, an alkyl or alkoxy group, $R_1$ represents an alkyl radical, $R_2$ represents a hydrogen atom, an alkyl, aralkyl or aryl radical, $R_3$ represents an alkyl or aralkyl radical, and X represents an anion.

Now we have found that benzimidazolium compounds of the general Formula 1

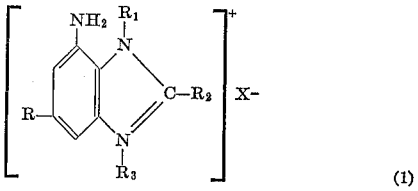

wherein R represents a halogen atom, an alkyl or an alkoxy group, $R_1$ represents an alkyl radical, $R_2$ represents a hydrogen atom, an alkyl, aralkyl or aryl radical, $R_3$ an alkyl or aralkyl radical and X an anion, can be prepared by treating benzimidazoles of the general Formula 2

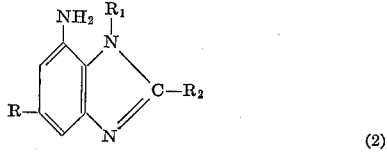

in which R, $R_1$ and $R_2$ are defined as above, with quaternizing agents and, if desired, converting the quaternary compounds obtained into their complex compounds.

The quaternization is effected in the presence or in the absence of solvents, at a temperature within the range 0° to 200° C. approximately, preferably from about 30° to 150° C., and, if desired, under increased pressure.

As quaternizing agents there may be used, above all, dialkyl-sulfates, such as, for example, dimethyl- or diethyl - sulfate, benzene- or toluene - sulfonic acid esters, as for example the methyl-, ethyl-, propyl- or butyl-esters, alkylhalides, such as, for example, methyl-, ethyl-, propyl- or butyl- or a higher alkylchloride, bromide or iodide, or aralkylhalides, as for example benzylchloride or benzylbromide.

The process of the present invention may be carried out in solvents, for example in alcohols such as methyl- or ethylalcohol, in esters, as for example in methyl-, ethyl-, propyl- or butylester of acetic acid, in ethers, for example diethyl-, dipropyl- or dibutylether, ethylgylcol, diethylgylcol or anisol, in ketones, such as acetone or methylethylketone, or in aromatic or aliphatic hydrocarbons or chlorohydrocarbons, such as chloroform, benzene, toluene, xylene, or chlorobenzene. It is also possible to use the quaternizing agents as solvents. In this case, for example, when using lower alkylhalides, the process is advantageously carried out in pressure vessels.

The quaternary methylsulfates can be prepared, for example, by dissolving 1 mole equivalent of the corresponding benzimidazole compound of Formula 2 in a hydrocarbon, for example in toluene, in the heat, and adding, drop by drop, 1 mole equivalent of dimethyl sulfate. The separation of the quaternary methyl compound of Formula 1 ($R_3$=—$CH_3$, X=—$CH_3SO_4$) in the form of crystals is accompanied by evolution of heat. When the reaction is terminated the methyl-sulfates of the quaternary compounds can be isolated by filtration in an almost quantitative yield. In the majority of cases the compounds dissolve readily in water, with a neutral reaction, and can be recrystallized for example in hot ethylalcohol. B ymeans of diazotization the primary amino group is detectable in a quantitative yield.

For conversion into a more difficultly soluble complex compound, for example into a zinc chloride double salt, zinc chloride can be added to a solution of methysulfate in water or in alcohol, for example in methyl alcohol or in ethyl alcohol, and the precipitated complex compound can be separated by filtration. These complex compounds are mode difficultly soluble in solvents containing hydroxyl groups than the methylsulfates and are also diazotized without difficulty.

The benzimidazolium compounds obtainable according to the process of the invention have partly fungicidal or bacteriostatic properties and may be used, for example, as disinfectants. Moreover, they are suitable as textile auxiliaries or intermediate products for the preparation of textile auxiliaries or dyestuffs.

The benzimidazoles of Formula 2 used as starting materials are obtained, for example, by reaction of 1-alkyl-amino-2,6-diaminobenzenes, which are substituted in 4-position by a halogen atom, an alkyl group, or an alkoxy group, with aliphatic carboxylic acids.

The following examples serve to illustrate the invention but they are not intended to limit it thereto, the parts being by weight unless otherwise stated.

*Example 1*

181.5 parts of 5-chloro-7-amino-1-methylbenzimidazole are dissolved at about 100° C. in 1,500 parts by volume of chlorobenzene. In the course of about 30 minutes, 126 parts of dimethylsulfate are added with stirring and the temperature is kept between 100° and 110° C. A colorless crystalline precipitate separates immediately. After the addition of the dimethylsulfate stirring is continued for another hour, then the crystals formed are filtered with suction and washed with a small amount of chlorobenzene. After drying at 60° to 80° C., 300 to 305 parts of 5-chloro-7-amino-1,3-dimethylbenzimidazolium-methyl-sulfate of the following formula

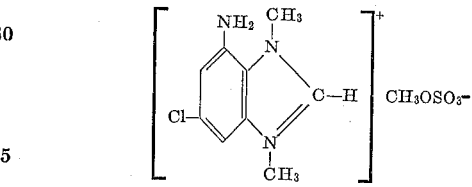

are obtained in the form of crystals which melt at 175°–179° C. and dissolve readily and with an almost neutral reaction in water.

In order to convert the methylsulfate into the zinc chloride complex compound it is dissolved in warm water and zinc chloride is added to the solution until the precipitation ceases. The zinc chloride double salt is difficultly soluble in cold water or in cold methylalcohol and forms a white crystalline powder melting at 235°–242° C.

The following table contains a number of further compounds corresponding to Formula 1, which can be obtained according to the process of the present invention:

| R | $R_1$ | $R_2$ | $R_3$ | X | Melting point °C. |
|---|---|---|---|---|---|
| Cl | $CH_3$ | H | $C_2H_5$ | $C_2H_5SO_4$ | 159 to 161. |
| Cl | $CH_3$ | H | $C_2H_5$ | $ZnCl_3$ | 276 to 278. |
| Cl | $C_2H_5$ | H | $CH_3$ | $CH_3SO_4$ | 230 to 323. |
| Cl | $C_2H_5$ | $CH_3$ | $CH_3$ | $CH_3SO_4$ | 218 to 220. |
| Cl | $C_2H_5$ | H | $C_2H_5$ | $ZnCl_3$ | 186 to 188. |
| Cl | $C_2H_5$ | $CH_3$ | $C_2H_5$ | $C_2H_5SO_4$ | 192 to 194. |
| Cl | $C_4H_9$ | H | $CH_3$ | $CH_3SO_4$ | 180 to 182. |
| Cl | $C_4H_9$ | H | $C_2H_5$ | $C_2H_5SO_4$ | 155 to 158. |
| Cl | $C_3H_7$ | H | $C_2H_5$ | $C_2H_5SO_4$ | 123 to 125. |
| Cl | $C_3H_7$ | H | $CH_3$ | $ZnCl_3$ | 171 to 176. |
| Cl | $CH_3$ | H | $C_{12}H_{25}$ | Br | |

Example 2

175 parts of 1-ethyl-5-methyl-7-aminobenzimidazole are dissolved in 1,000 parts by volume of chloroform. In the course of 15 minutes, 126 parts of dimethylsulfate are then dropped into the solution at boiling temperature. After a short period of time the quaternary salt precipitates in the form of crystals. After 4 to 5 hours, the precipitate is filtered with suction, washed with a small amount of chloroform and dried at 60° C. The yield amounts to 275 parts of 1-ethyl-3,5-dimethyl-7-aminobenzimidazolium-methylsulfate of the following formula

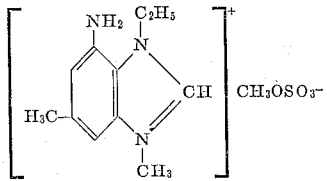

which melts after recrystallization in ethylalcohol at 204°–208° C. and dissolves readily in cold water.

Example 3

121 parts of 1,5-dimethyl-7-aminobenzimidazole are dissolved in 1,000 parts by volume of benzene. During 15 minutes, 126 parts of dimethylsulfate are dropped into the solution at boiling temperature. After about 4 hours the pale precipitate which has separated is filtered with suction, washed with a small amount of benzene, and dried at 60° C. The yield amounts to 250 parts of 1,3,5-trimethyl-7-aminobenzimidazolium-methylsulfate of the following formula

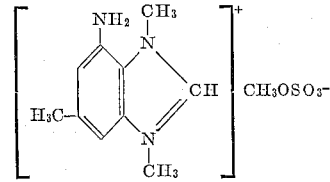

When dissolved in water, the product gives a clear solution. After recrystallization in ethylalcohol it melts at 175° to 178° C.

When using instead of 126 parts of dimethylsulfate 155 parts of diethylsulfate, 280 parts of 1,5-dimethyl-3-ethyl-7-aminobenzimidazolium-ethylsulfate of the following formula

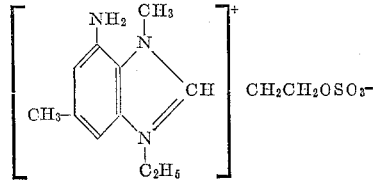

are obtained, which, after recrystallization in ethyl-alcohol, melt at 160°–162° C.

Example 4

175 parts of 1-ethyl-5-methyl-7-aminobenzimidazole are dissolved in 1,000 parts by volume of chloroform and mixed at 60° C. with 155 parts of diethylsulfate. The quaternary product separates in the form of a syrup. The chloroform is distilled off by means of steam, and the zinc chloride double salt of the 1,3-diethyl-5-methyl-7-aminobenzimidazoliumcation of the following formula

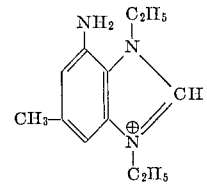

is precipitated by addition of an aqueous solution of zinc chloride. A white crystalline powder is formed; the yield amounts to 275 parts.

The zinc chloride double salts of the following benzimidazolium compounds of Formula 1 can be prepared in analogous manner.

| R | $R_1$ | $R_2$ | $R_3$ | Appearance |
|---|---|---|---|---|
| Methyl | n-Butyl | Hydrogen | Methyl | White crystalline powder. |
| Do | Methyl | Methyl | do | Do. |
| Ethyl | do | Hydrogen | do | Do. |
| Methoxy | do | do | do | Do. |

We claim:
1. A compound of the formula

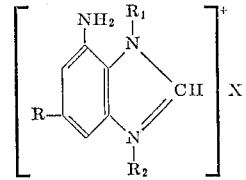

wherein R represents chlorine, methyl, ethyl and methoxy, $R_1$ represents alkyl containing 1 to 4 carbon atoms and $R_2$ represents alkyl containing 1 to 12 carbon atoms and X stands for a $ZnCl_3$, alkylsulfate, sulfate, or arylsulfonic acid anion.

2. The compound of the formula

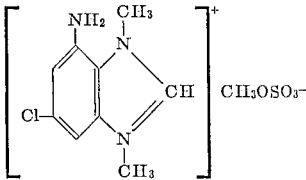

3. The compound of the formula

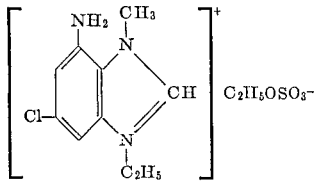

4. The compound of the formula

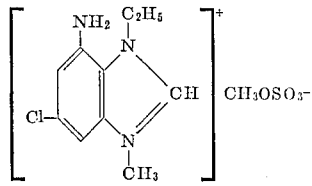

5. The compound of the formula

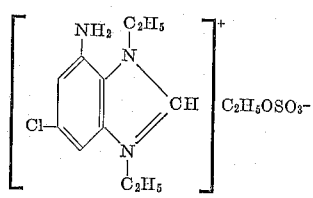

6. The compound of the formula

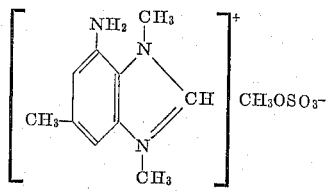

References Cited

UNITED STATES PATENTS

| | | |
|---|---|---|
| 2,170,414 | 8/1939 | Graenacher et al. __ 260—309.2 |
| 2,312,922 | 3/1943 | Martin et al. _____ 260—309.2 |
| 2,965,647 | 12/1960 | Wiegand et al. ____ 260—309.2 |

FOREIGN PATENTS 227,023  3/1963  Austria.

OTHER REFERENCES

Bamberger et al.: Chemical Abstracts, vol. 56, col. 15,635 (1962).

Chemical Abstracts, vol. 57, col. 14,623 (1962).

Hollinshead et al.: Jour. Pharm. Exper. Therpeut., vol. 123, p. 56 relied on (1958).

Hoover et al.: Jour. Amer. Chem. Soc., vol. 77, pp. 4324–27 (1955).

Simpson: Jour. Chem. Soc. (London), 1946, pp. 94–7.

WALTER A. MODANCE, *Primary Examiner.*

JOHN D. RANDOLPH, *Examiner.*

NATALIE TROUSOF, *Assistant Examiner.*